United States Patent
Drotleff et al.

(10) Patent No.: US 10,110,790 B2
(45) Date of Patent: Oct. 23, 2018

(54) CAMERA MODULE FOR A VEHICLE

(71) Applicant: Robert Bosch GmbH, Stuttgart (DE)

(72) Inventors: Hans-Georg Drotleff, Rutesheim (DE); Nikolai Bauer, Moeglingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 15/596,267

(22) Filed: May 16, 2017

(65) Prior Publication Data
US 2017/0339323 A1    Nov. 23, 2017

(30) Foreign Application Priority Data
May 18, 2016  (DE) .................. 10 2016 208 547

(51) Int. Cl.
*H04N 5/225*  (2006.01)

(52) U.S. Cl.
CPC ......... *H04N 5/2254* (2013.01); *H04N 5/2253* (2013.01); *H04N 5/2257* (2013.01)

(58) Field of Classification Search
CPC ... H04N 5/2254; H04N 5/2253; H04N 5/2257
See application file for complete search history.

(56) References Cited

U.S. PATENT DOCUMENTS

| | | | | |
|---|---|---|---|---|
| 2003/0043289 A1* | 3/2003 | Konno | ............... | G02B 7/023 348/335 |
| 2004/0113047 A1* | 6/2004 | Tu | ............... | H01L 27/14618 250/208.1 |
| 2005/0110889 A1* | 5/2005 | Tuttle | ............... | H01L 27/14618 348/340 |
| 2005/0169620 A1* | 8/2005 | Minamio | ............... | H01L 27/14618 396/71 |
| 2006/0006486 A1* | 1/2006 | Seo | ............... | H01L 24/97 257/433 |
| 2007/0029466 A1* | 2/2007 | Chang | ............... | H01L 27/14618 250/208.1 |
| 2007/0108577 A1* | 5/2007 | Tu | ............... | H01L 23/10 257/680 |
| 2007/0158538 A1* | 7/2007 | Wang | ............... | H01L 27/14625 250/239 |
| 2007/0159703 A1* | 7/2007 | Apel | ............... | G02B 7/021 359/819 |
| 2008/0100934 A1* | 5/2008 | Webster | ............... | G02B 7/021 359/830 |
| 2009/0046184 A1* | 2/2009 | Ma | ............... | H01L 27/14618 348/294 |
| 2009/0160998 A1* | 6/2009 | Fukamachi | ............... | G02B 7/021 348/340 |
| 2010/0033850 A1* | 2/2010 | Chang | ............... | G02B 7/021 359/819 |

(Continued)

FOREIGN PATENT DOCUMENTS

| | | |
|---|---|---|
| CN | 104749858 A | 7/2015 |
| DE | 102014103473 A1 | 9/2014 |

(Continued)

*Primary Examiner* — Abdelaaziz Tissire
(74) *Attorney, Agent, or Firm* — Norton Rose Fulbright US LLP; Gerard Messina

(57) ABSTRACT

A camera module, in particular for a vehicle, including a lens holder and a sensor carrier on which a carrier element is attached. The lens holder is fastened on the carrier element by an adhesive.

11 Claims, 3 Drawing Sheets

(56) References Cited

U.S. PATENT DOCUMENTS

| | | | |
|---|---|---|---|
| 2010/0034531 A1* | 2/2010 | Go | G03B 11/00 |
| | | | 396/529 |
| 2010/0110269 A1* | 5/2010 | Honda | G02B 3/00 |
| | | | 348/340 |
| 2011/0032416 A1 | 2/2011 | Naito et al. | |
| 2011/0063450 A1* | 3/2011 | Go | G03B 11/00 |
| | | | 348/164 |
| 2012/0038803 A1* | 2/2012 | Tsai | H01L 27/14618 |
| | | | 348/294 |
| 2012/0176534 A1* | 7/2012 | Tsai | H04N 5/2257 |
| | | | 348/374 |
| 2012/0200946 A1* | 8/2012 | Wippermann | G02B 7/028 |
| | | | 359/811 |
| 2013/0063655 A1 | 3/2013 | Hsu | |
| 2014/0063265 A1* | 3/2014 | Shukla | G03B 13/18 |
| | | | 348/187 |
| 2014/0117479 A1* | 5/2014 | Jan | H04N 5/2257 |
| | | | 257/432 |
| 2015/0029384 A1 | 1/2015 | Luan | |
| 2015/0124098 A1 | 5/2015 | Winden et al. | |
| 2015/0156381 A1* | 6/2015 | Oba | G02B 7/026 |
| | | | 348/374 |
| 2015/0326763 A1 | 11/2015 | Campbell et al. | |
| 2015/0378133 A1 | 12/2015 | Kuwana et al. | |
| 2017/0163856 A1* | 6/2017 | Wang | G02B 7/003 |

FOREIGN PATENT DOCUMENTS

| | | |
|---|---|---|
| EP | 1659781 A1 | 5/2006 |
| WO | 2010111465 A1 | 9/2010 |
| WO | 2012005456 A2 | 1/2012 |

\* cited by examiner a)

b)

c)

CAMERA MODULE FOR A VEHICLE

CROSS REFERENCE

The present application claims the benefit under 35 U.S.C. § 119 of German Patent Application No. DE 102016208547.6 filed on May 18, 2016, which is expressly incorporated herein by reference in its entirety.

BACKGROUND INFORMATION

The present invention relates to a camera module for a vehicle.

Various conventional camera structures are available. For example, German Patent Application No. DE 10 2014 103 473 A1 describes a sensor carrier fastened by a screw connection.

SUMMARY

The present invention relates to a camera module, in particular for a vehicle, including a lens holder and a sensor carrier on which a carrier element is attached. The lens holder is fastened on the carrier element by an adhesive.

This specific embodiment offers the advantage that, using an intermediate piece or carrier element, an optimal attachment of a lens holder on a sensor carrier is possible via an adhesive bond. A lens holder is understood as a device that is set up to accept at least one optical element. A sensor carrier is understood as a device that is set up to accept an image sensor, possibly also having additional fastening parts. A carrier element is understood as a device that can be attached on the sensor carrier and is designed to accept adhesive. The sensor carrier can for example be fashioned as a circuit board. Here, an image sensor can be integrated in the sensor carrier, or can be attached on the sensor carrier as a separate component. Both the image sensor and the carrier element can be attached on the sensor carrier using a reflow method.

In accordance with the present invention, the adhesive point is situated very close to the sensor carrier, thereby streamlining the overall construction and reducing the required constructive space. In addition, a screw connection can be omitted, as can a further component that may be required to hold the lens holder. Because screws, bores, and minimum thicknesses of the lens holder are no longer necessary, a miniaturization of the overall design/camera module is possible as a result. The maximum diameter of the camera module can theoretically be reduced to the diameter of the lens holder. Due to the miniaturization, the camera module can be used in a more versatile fashion, and production, storage, and logistics are lower in cost.

The design according to the present invention also offers the possibility of a multi-axial orientation of the lens holder, or of an optical mechanism attached in the lens holder, relative to the sensor carrier or to an image sensor attached to the sensor carrier. In addition, a compact construction and a stable connection between the individual components are enabled.

In an advantageous specific embodiment of the present invention, the carrier element is fashioned to accept the adhesive and the lens holder.

This specific embodiment offers the advantage that via the bearer element a reliable connection between the sensor carrier and lens holder is possible. The carrier element can for example have a tub-shaped profile, or a profile that runs to a point downwardly, for accepting the adhesive. The carrier element can be made of a metallic material, in particular at least one stamped bent component. The carrier element can be fastened on the sensor carrier by a solder connection and/or by a welded connection and/or by an adhesive bond. The deeper the carrier element is made, for example the deeper the tub-shaped contour is made, the more play is provided in the positioning of the lens holder relative to the sensor carrier. This is advantageous for the compensation of manufacturing tolerances of lenses or optical mechanisms or components of the camera module, for example the lens holder. The accepting of the lens holder by the carrier element is understood here as meaning that a partial region of the lens holder is accepted, not the entire component.

In a further specific embodiment of the present invention, when the adhesive is cured, the lens holder forms a positive-fit connection with the adhesive and/or with the carrier element.

This specific embodiment offers the advantage that even if the adhesive bond has detached, a solid and reliable connection exists between the sensor carrier and the lens holder. Here, the adhesive bond between the lens holder and the cured adhesive, and/or between the cured adhesive and the carrier element, can be detached. Due to the selected geometry of the lens holder and/or carrier element, a corresponding positive-fit connection can be achieved after the curing of the adhesive.

The connection with a positive fit between the carrier element and the lens holder enables a smaller adhesive surface, and brings about a more robust, non-detachable connection with regard to temperature and useful life. As a consequence, a permanent connection is generated that will exist even if the adhesive bond of the individual adhesive partners fails.

In a further specific embodiment of the present invention, the carrier element is made in one piece, and is fashioned along an entire circumference of the lens holder.

This specific embodiment offers the advantage that a very stable connection between the lens holder and the sensor carrier is possible. In addition, the adhesive enables a hermetic shielding of the image sensor, or of the interior of the camera module.

In a further specific embodiment of the present invention, the carrier element is made up of at least two segments.

This specific embodiment offers the advantage that a flexible configuration of the carrier element is possible. In this way, for example the constructive space on the sensor carrier can be optimally exploited. For example, the carrier element can be made up of three segments that are attached so as to be offset by 120° to one another along a circumference of the lens holder.

In an advantageous specific embodiment of the present invention, the lens holder has at least one shaped part for forming a positive-fit connection between the lens holder and the adhesive and/or the carrier element when the adhesive is cured.

This specific embodiment offers the advantage that, independently of the material bond between the cured adhesive and the lens holder, a mechanical bond via the positive-fit connection remains. There can also be a positive-fit connection between the lens holder and the carrier element when the adhesive is cured. The shaped part of the lens holder can have a wide variety of shapes. For example, a wall thickness or the diameter of the lens holder can be modified. Likewise, the lens holder can have a bend, or can be curved. Positive or negative contours are also possible that result in a positive-fit connection with the cured adhesive after introduction into an adhesive and the curing thereof.

For example, a positive contour can be fashioned as a web that is attached on the lens holder or is integrated therein. The web can be fashioned such that a positive-fit connection can be formed with the carrier element when the adhesive is hardened and/or cured. This web can be fashioned either at one side or at both sides. Shaped parts are possible having corners or edges, or that are rounded or oval.

In a further specific embodiment of the present invention, the carrier element has at least one shaped part for forming a positive-fit connection between the carrier element and the adhesive and/or the lens holder when the adhesive is cured.

This specific embodiment of the present invention offers the advantage that even if the material bond between the cured adhesive and the carrier element has become detached, a positive-fit connection, and thus a solid connection between the cured adhesive and the carrier element, still exists. Likewise, if the bond between the cured adhesive and the carrier element has become detached, a positive-fit connection can exist between the lens holder and the cured adhesive and carrier element. The carrier element shaped part can here be made similar to the formation of the shaped part of the lens holder. For example, the carrier element shaped part is realized as a web, the web being used to form a positive-fit connection with the cured adhesive and/or the lens holder when the adhesive is hardened and/or cured.

In an advantageous specific embodiment, the positive-fit connection is independent of the presence of a material bond between the cured adhesive and the lens holder and/or the carrier element.

This specific embodiment offers the advantage that a fixed connection via the positive-fit connection remains between the individual elements even if the adhesive bond has detached. The connection thus remains even if the material bond is not present between the lens holder and the cured adhesive or the cured adhesive and the carrier element.

In addition, an embodiment of the present invention includes a camera module in which the sensor carrier carries an image sensor and radiation impinging on the image sensor is guided at least partially through a lens that is held by the lens holder.

In addition, an embodiment of the present invention includes a lens holder for mounting on a sensor carrier or a carrier element using adhesive. The lens holder here has a sub-region that is provided to be at least partially encapsulated by the adhesive. This sub-region has at least one shaped part so that when the adhesive is hardened and/or cured a positive-fit connection arises between the lens holder and the cured adhesive.

The shaped part can be fashioned for example as a web that produces a positive-fit connection between the adhesive and the lens holder when the adhesive is hardened and/or cured.

In addition, an embodiment of the present invention includes a method for mounting a camera module. Here the camera module includes a sensor carrier, carrier element, and a lens holder. The method has the following steps:

applying an adhesive onto the carrier element;
    positioning the lens holder and the carrier element and/or the sensor carrier relative to one another;
    fixing the lens holder on the carrier element.

This method offers the advantage that it enables a very flexible and simple attachment of the lens holder on the sensor carrier. Here, through the adhesive an orientation can take place along all spatial directions, and/or a corresponding rotation or inclination about an arbitrary axis can take place. In addition, through the specific design of the lens holder and/or carrier element, a very reliable connection between the elements is possible if a positive-fit connection is formed in addition to the material bond. In general, a positioning of the lens holder relative to the carrier element and/or sensor carrier is possible in every conceivable specific embodiment. Thus, for example only the sensor carrier can be positioned relative to the lens holder, or only the lens holder can be positioned relative to the sensor carrier. It is also possible for both components to be positioned relative to one another and for the position of the lens holder and sensor carrier to change during the positioning. The same holds for a positioning of the lens holder relative to the carrier element, or for a positioning of the carrier element relative to the lens holder.

In the positioning of the lens holder relative to the carrier element and/or to the sensor carrier, curing effects of the adhesive can be taken into account. As a result, it is possible for the position during the positioning of the lens holder to differ from the final position after the curing of the adhesive.

In a further specific embodiment of the method, the method can include an additional step of attaching the carrier element on the sensor carrier. The attaching here takes place in particular by soldering and/or welding and/or the use of adhesive.

This specific embodiment offers the advantage that a very simple attaching of the carrier element on the sensor carrier is possible. As a function of the lens carrier that is used, different carrier elements can also be used that can be subsequently attached on the sensor carrier. Thus, the same components can be used for different lens holders, in which the carrier element is attached at different locations on the sensor carrier. In general, in this way there results a flexible construction kit for the construction of various camera modules.

In a further specific embodiment of the method, an image sensor is attached on the sensor carrier, and at least one optical element is situated in the lens holder. In the step of positioning of the lens holder, this holder is positioned relative to the sensor carrier in such a way that after the fixing of the lens holder the image sensor is situated in a preferred image plane of the at least one optical element.

This specific embodiment offers the advantage that a very precise positioning of the lens holder, or of an optical mechanism present in the lens holder, relative to the image sensor is possible. In this way, an optimal imaging of a surrounding environment on the image sensor is enabled. The preferred image plane is here understood as an image plane in which an image sensor is to be situated in order to produce the best possible image. The positioning can for example take place using known methods such as active alignment. The optical element can for example be one or more lenses, or other optical elements standard in an objective. Here as well, in the positioning relative to one another either only individual components or all components can be moved.

DETAILED DESCRIPTION OF EXAMPLE EMBODIMENTS

Figure 1:
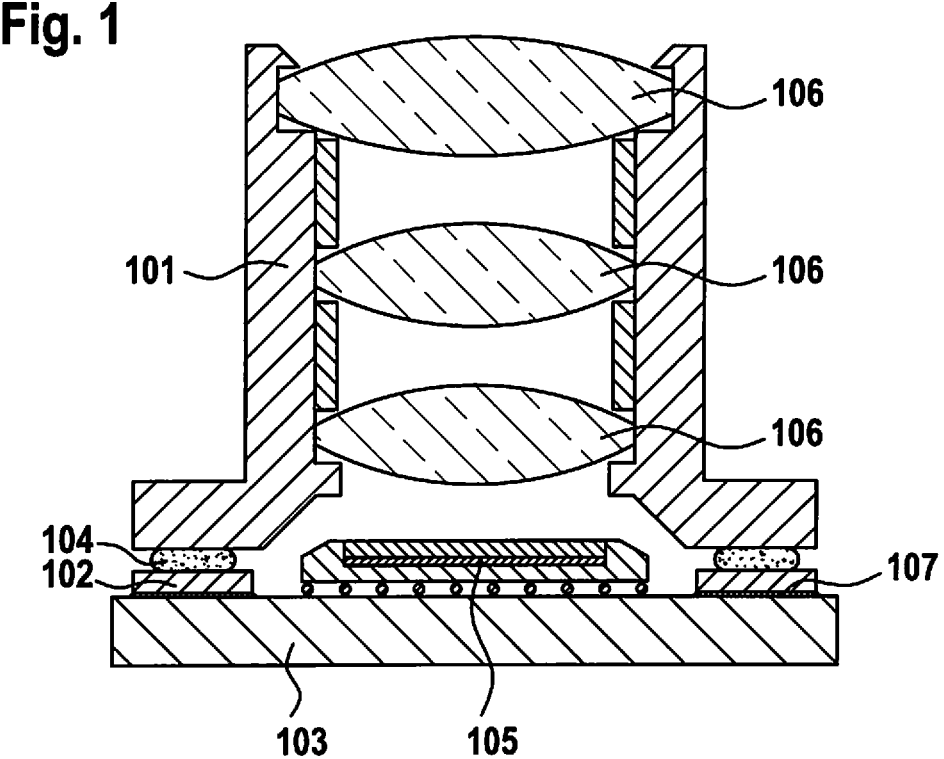
FIG. 1 shows a schematic design of the camera module.

FIG. 1 shows an example of a design of the camera module. Lens holder 101 holds an objective made up of a plurality of lenses 106. On sensor carrier 103, which is fashioned as a circuit board (PCB), a carrier element 102 is attached by a solder connection 107. In addition, an image sensor 105 is attached on sensor carrier 103. Both carrier element 102 and image sensor 105 have been attached on sensor carrier 103 in a reflow method. Carrier element 102 has a contour for accepting lens holder 101 using an adhesive 104. Carrier element 102 can be realized to be continuous over the circumference zone of lens holder 101, or can be realized in segments, so that the adhesive bond via adhesive 104 can be completely continuous or can be realized partially.

Specifically, carrier element 102 can be realized such that it forms a tub-shaped contour for accepting adhesive 104. Carrier element 102 can be made up of a part or a group of parts. In this exemplary embodiment, carrier element 102 is made up at least partly of a metallic material that is suitable for soldering. Carrier element 102 has a depth of approximately 1 mm, where the depth can be understood as the height of carrier element 102 up to which this element can be filled with liquid (given negligible surface tension). This corresponds to the extension of carrier element 102 in the Z direction. In general, carrier element 102 can also have a depth of from a few micrometers up to several millimeters. The dimension of carrier element 102 here is also a function of the size of the camera module and the resulting tolerances. In order to ensure adequate play for the orientation of lens holder 101 relative to the sensor carrier in the Z direction, the depth should be chosen to be greater than 0.3 mm, in particular greater than 0.5 mm. Here, the Z direction is formed by a vector standing perpendicular on the surface of sensor carrier 103 facing lens holder 101, the vector pointing in the direction of lens holder 101.

Figure 2:
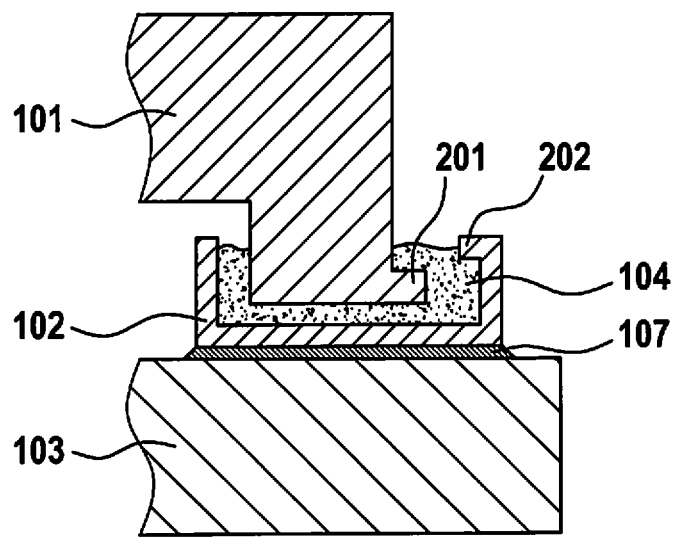
FIG. 2 shows a detailed view of the connection between the lens holder, the adhesive, and the carrier element.

FIG. 2 shows another possible design of the camera module. Here, lens holder 101 has a shaped part 201 in the direction of an adhesive zone of lens holder 101 by which a positive-fit connection results between lens holder 101 and cured adhesive 104 when adhesive 104 is cured. In FIG. 2, the shaped part is realized in the form of a web 201 that is formed at one side. However, a two-side realization of web 201 is also possible. An adhesive zone is here understood as the region of lens holder 101 that is enclosed at least partly by adhesive 104.

In this exemplary embodiment, carrier element 102 is fashioned with a tub shape and can be made for example of a stamped bent part. Carrier element 102 has a carrier element shaped part 202 by which a positive-fit connection can be formed between carrier element 102 and cured adhesive 104. In this exemplary embodiment, carrier element shaped part 202 is also realized as web 202, attached on one side of carrier element 102.

Figure 5:
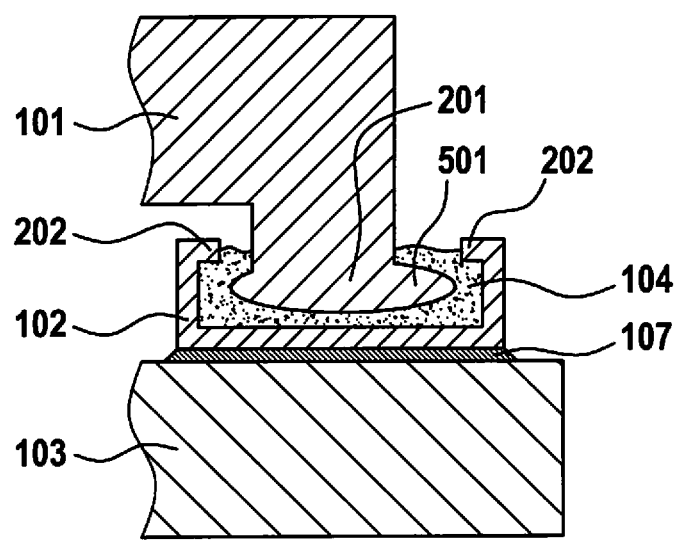
FIG. 5 shows a possible shaped part of the lens holder, or a possible carrier element shaped part.

FIG. 5 shows a further specific embodiment of lens holder 101 and of carrier element 102. Here, shaped part 201 is fashioned as rounded contour 501, whose diameter is greater than the diameter of lens holder 101, which is not surrounded by adhesive 104. In this exemplary embodiment, carrier element 102 is configured such that carrier element shaped part 202 is realized at two sides. On both sides of tub-shaped carrier element 102, there are attached webs 202 that extend in the direction of lens holder 101 and that are fashioned such that a positive-fit connection results between cured adhesive 104 and carrier element 102 when adhesive 104 is cured. Through shaped part 201 of lens holder 101 and carrier element shaped part 202 of carrier element 102, overall there results a positive-fit connection between lens holder 101, cured adhesive 104, and carrier element 102. As a result, there results a fixed connection between sensor carrier 103 and lens holder 101.

Figure 4:
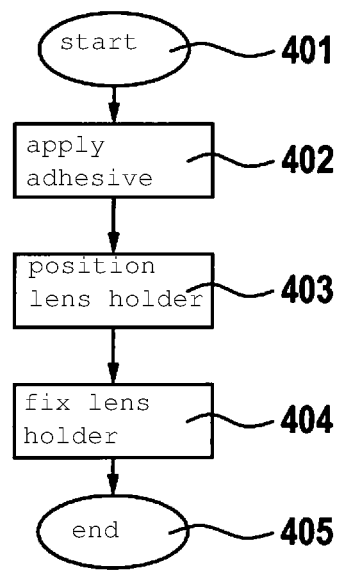
FIG. 4 shows an example of a method diagram.

FIG. 4 shows an example of a method sequence for mounting the disclosed camera module, made up of a sensor carrier 103, a carrier element 102, and a lens holder 101. The method starts in step 401.

In step 402, an adhesive 104 is applied onto carrier element 102. Depending on the embodiment of carrier element 102, adhesive 104 can be applied thinly, or a quantity of adhesive 104 can be selected such that for example a tub-shaped carrier element 102 can be filled up to a specified height.

In step 403, there takes place the positioning of lens holder 101 relative to carrier element 102 and/or relative to sensor carrier 103. Due to adhesive 104 that is used, an orientation in all directions is possible. In addition, lens holder 101 can be tilted or inclined in all directions, because adhesive 104 does not determine any fixed axes of rotation or directions of movement. If carrier element 102 is fashioned as a tub-shaped contour, then due to the quantity of adhesive 104 and the height of tub-shaped carrier element 102, a very large displacement in the Z direction can take place.

In step 404, lens holder 101 is fixed on carrier element 102. For the fixing of lens holder 101, adhesive 104 is cured. For this purpose, various methods can be used depending on the adhesive 104 that is used. Adhesive 104 can be cured for example using UV light. Alternatively, curing through heating or cooling is possible. Different curing methods can also be combined in order to accelerate the processes. For example, a pre-curing of adhesive 104 can take place using UV radiation, and in a further process step adhesive 104 can be treated with a further method, for example further heating, for complete curing.

The method ends in step 405.

The example method can include an additional step of attaching carrier element 102 on sensor carrier 103. In this step, carrier element 102 is attached for example by soldering and/or welding and/or the use of adhesive. This step can advantageously be carried out before step 402.

In a further exemplary embodiment, an image sensor 105 is attached on sensor carrier 103, and lens holder 101 bears at least one optical element. In step 404 of the positioning of lens holder 101, lens holder 101 is positioned relative to sensor carrier 103 in such a way that after the fixing of lens holder 101, image sensor 105 is situated in a preferred image plane of the at least one optical element. Changes in position of lens holder 101 that may occur after the curing of adhesive 104 can be taken into account in this positioning. For the positioning, known methods such as active alignment can be used.

Figure 3:
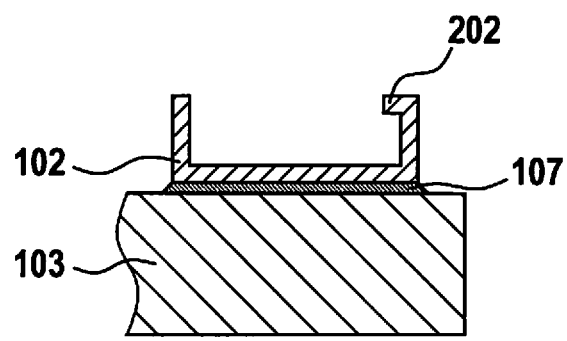
FIG. 3 shows the schematic procedure of the assembly of a camera module.
Figure 3:
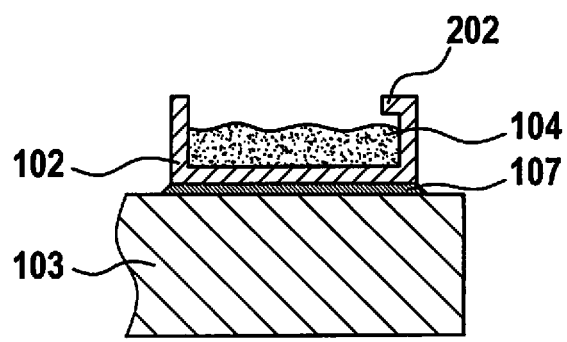
Figure 3:
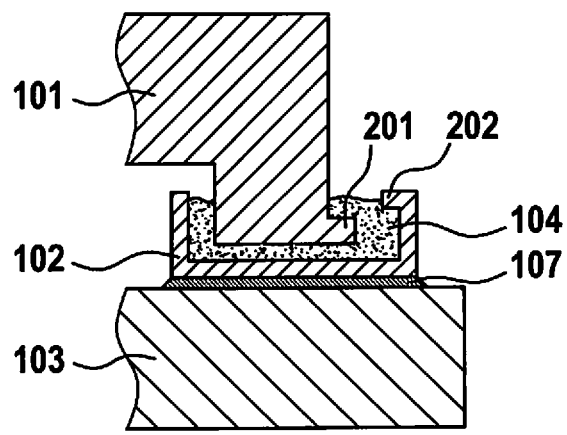

FIG. 3 shows the various method steps again in graphic form. FIG. 3a) shows a sensor carrier 103 on which carrier element 102 is attached, for example by a solder connection 107. In FIG. 3b), adhesive 104 is dispensed into carrier element 102. Subsequently, in FIG. 3c) lens holder 101 is positioned relative to carrier element 102 and/or relative to sensor carrier 103. For this purpose, lens holder 101 is immersed in the still-liquid adhesive 104, and is moved to the corresponding position. After the curing of adhesive 104, lens holder 101, cured adhesive 104, and carrier element 102 form a positive-fit connection due to the shaped part 201 of lens holder 101 and carrier element shaped part 202 of carrier element 102. This positive-fit connection exists even if there is no material bond between the individual components, for example because adhesive 104 is not suitable for a permanent material bond with the material of lens holder 101 and/or of carrier element 102.

What is claimed is:

1. A camera module, comprising:
   a lens holder carrying a lens;
   a sensor carrier carrying a sensor below the lens; and
   a carrier element between the lens holder and the sensor carrier and attached onto an upper surface of the sensor carrier;
   wherein:
      an adhesive that fastens the lens holder to the carrier element is arranged on an upper surface of the carrier element facing a bottom surface of the lens holder;
      a laterally extending protrusion of the lens holder is embedded in the adhesive so that part of the adhesive that is arranged on the upper surface of the carrier element is also over a top surface of the protrusion of the lens holder; and
      a part of the adhesive that is arranged on the upper surface of the carrier element is also below a laterally extending protrusion of the carrier element.

2. The camera module as recited in claim 1, wherein the carrier element is fashioned to accept the adhesive and the lens holder.

3. The camera module as recited in claim 1, wherein the lens holder forms a positive-fit connection with at least one of the adhesive and with the carrier element, when the adhesive is cured.

4. The camera module as recited in claim 1, wherein the carrier element is made in one part, and is fashioned along an entire circumference of the lens holder.

5. The camera module as recited in claim 1, wherein the carrier element is made up of at least two segments.

6. The camera module as recited in claim 1, wherein the adhesive is cured and is arranged between the protrusions of the lens holder and carrier element.

7. The camera module as recited in claim 6, wherein the arrangement of the cured adhesive between the protrusions is such that the cured adhesive is not removable from between the protrusions even with loss of a material bond between (a) the cured adhesive and (b) the lens holder and the carrier element.

8. The camera module as recited in claim 1, wherein the sensor is an image sensor and radiation impinging on the image sensor is guided at least partially through the lens that is held by the lens holder.

9. A method for mounting a camera module including a lens holder carrying a lens, a sensor carrier carrying a sensor below the lens, and a carrier element between the lens holder and the sensor carrier and attached onto an upper surface of the sensor carrier, the method comprising:
   applying an adhesive onto an upper surface of the carrier element with a part of the adhesive arranged on the upper surface of the carrier element being below a laterally extending protrusion of the carrier element;
   positioning the lens holder and at least one of the carrier element and the sensor carrier relative to each other with a part of the lens holder being positioned within the adhesive that is on the upper surface of the carrier element, with the upper surface of the carrier element faces a bottom surface of the lens holder and with a laterally extending protrusion of the lens holder being embedded in the adhesive so that part of the adhesive that is arranged on the upper surface of the carrier element is also over a top surface of the protrusion of the lens holder; and
   curing the adhesive while the adhesive is arranged at least partly below the protrusion of the carrier element and at least partly above the protrusion of the lens holder, thereby fixing the lens holder to the carrier element.

10. The method as recited in claim 9, further comprising:
    attaching the carrier element on the sensor carrier via at least one of soldering, welding, and an adhesive.

11. The method as recited in claim 9, wherein the sensor is an image sensor, and wherein, in the step of positioning, the lens holder is positioned relative to the sensor carrier in such a way that, after the fixing of the lens holder, the image sensor is situated in a predetermined image plane of the lens.

\* \* \* \* \*